(12) United States Patent
Boll

(10) Patent No.: US 6,229,626 B1
(45) Date of Patent: May 8, 2001

(54) METHOD APPARATUS AND PRODUCT PROVIDING DIRECT CALCULATION OF THE COLOR GAMUT OF COLOR REPRODUCTION PROCESSES

(75) Inventor: Harold Boll, Winchester, MA (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/132,452

(22) Filed: Aug. 11, 1998

Related U.S. Application Data

(60) Provisional application No. 60/062,809, filed on Oct. 24, 1997.

(51) Int. Cl.[7] .................................................. G06F 15/00
(52) U.S. Cl. ........................... 358/1.9; 358/504; 358/515; 358/518
(58) Field of Search ......................... 358/1.1, 1.9, 1.6, 358/500, 504, 515, 518, 519, 501, 538; 345/431

(56) References Cited

U.S. PATENT DOCUMENTS

| | | | |
|---|---|---|---|
| 3,825,673 | 7/1974 | Schreiner et al. | 348/652 |
| 5,323,249 | 6/1994 | Liang | 358/518 |
| 5,438,649 | 8/1995 | Ruetz | 358/1.9 |
| 5,450,216 | 9/1995 | Kasson | 358/518 |
| 5,470,076 | 11/1995 | Cadorniga | 473/384 |
| 5,553,199 * | 9/1996 | Spaulding et al. | 358/1.9 |
| 5,574,666 | 11/1996 | Ruetz et al. | 358/1.1 |
| 5,596,428 | 1/1997 | Tytgat et al. | 358/518 |
| 5,610,732 | 3/1997 | Komatsu | 358/518 |
| 5,611,030 | 3/1997 | Stokes | 345/431 |
| 5,699,491 * | 12/1997 | Barzel | 358/1.9 |
| 5,704,026 | 12/1997 | Wan et al. | 358/518 |
| 5,721,572 | 2/1998 | Wan et al. | 345/431 |
| 5,731,818 | 3/1998 | Wan et al. | 358/518 |
| 5,740,076 | 4/1998 | Lindbloom . | |
| 5,878,195 * | 3/1999 | Mahy | 358/1.9 |
| 5,883,632 | 3/1999 | Dillinger | 345/431 |

FOREIGN PATENT DOCUMENTS

| | | | |
|---|---|---|---|
| 0 626 783 A2 | 5/1994 | (EP) | H04N/1/46 |
| 0 665 682 A2 | 1/1995 | (EP) | H04N/1/60 |

* cited by examiner

Primary Examiner—Edward Coles
Assistant Examiner—Mark Wallerson
(74) Attorney, Agent, or Firm—David M. Woods

(57) ABSTRACT

A system providing a direct construction or calculation of color gamuts offering advantages over earlier techniques with respect to speed of calculations and the accuracy of the gamut description. The starting point for the gamut construction process is the calculation of a forward model from color patch measurement data which establishes an analytical relationship between ink and color in a given direction: ink to color. The model is used to obtain a regular sampling of profile connection space color values with corresponding inkings on the surface of the ink space polygon. These points are ordered by angle and by expected ink behavior to define the connectivity of the points of the gamut boundary.

4 Claims, 6 Drawing Sheets

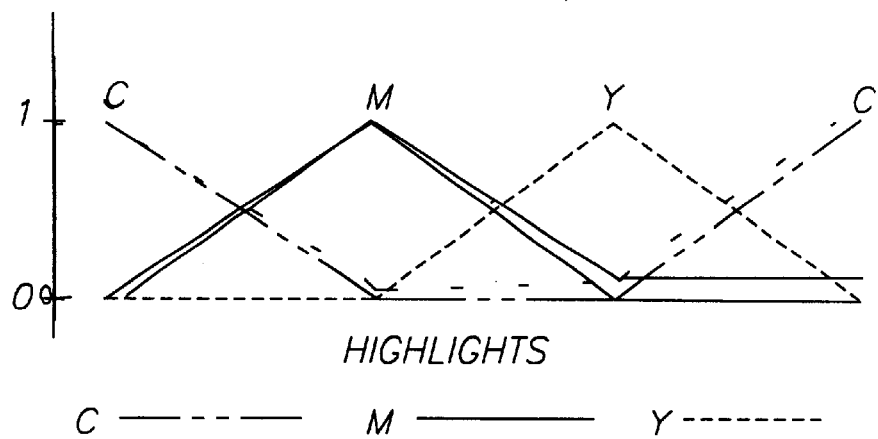
FIG. 7b1
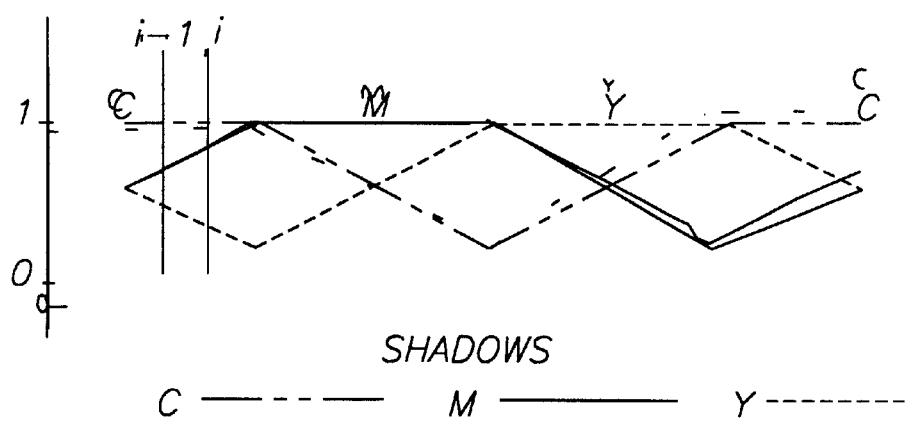
FIG. 7b2

METHOD APPARATUS AND PRODUCT PROVIDING DIRECT CALCULATION OF THE COLOR GAMUT OF COLOR REPRODUCTION PROCESSES

CROSS REFERENCE TO RELATED APPLICATION

This application is a continuation of U.S. provisional application Ser. No. 60/062,809, filed Oct. 24, 1997, entitled Direct Calculation of the Color Gamut of Color Reproduction Processes by Harold Boll and incorporated by reference herein.

BACKGROUND OF THE INVENTION

1. Field of the Invention

The present invention relates generally to the field of color gamut computation in color reproduction and, in particular, the invention relates to a system for efficiently and accurately computing a color gamut for any medium expressing color and in which the channel intensities can be controlled digitally.

2. Description of the Related Art

This invention is in the field of color reproduction in general and, in particular related to the explicit determination of the color gamut for a medium typically employed in a color process such as an output process like ink or dye on paper or exposure of film. Examples of such processes are:

offset lithography, in which a four-color process employs printing inks as colorants applied to paper;

halftone screen pattern, by a printing press;

gravure printing which employs printing inks applied to paper;

off-press proofing systems which employ toners as colorants to simulate the effect of an offset press;

computer-driven printers, which use a variety of technologies and colorants, such as jettable inks, toners, and dyes, applied in various continuous-tone, halftone, or dithered patterns; or digital exposure of negative or positive films by a film writer.

Most of the paper-based processes make use of three chromatic colorants (inks, dyes, toners) while the film-based processes are controlled by the intensity of red, green and blue light exposures. For paper-based processes the colorants are commonly chosen to be the subtractive primaries cyan, magenta, and yellow (abbreviated as C, M, and Y). In addition, there may be an achromatic, or black, colorant (abbreviated as K) which increases the overall range of darker colors attainable.

To print digital images on these devices, it is often necessary to convert colors among different device color spaces. Consider the workflow in which a picture is digitized by a scanner, viewed on a monitor and then output to a four-color offset press. To obtain a pleasing rendering in all steps of this process, it is necessary to have explicit control over the transformations which convert among all the various color spaces: 1) scanner RGB, 2) monitor RGB, and 3) CMYK inks on press.

Color management systems have been developed by various companies which perform the above outlined task, namely, to produce desired and pleasing renderings of images from input, display and output. These color management systems use device profiles to describe the colorimetric properties of color capable devices with respect to the mediums they utilize. Each profile contains transformations between the native device color space and a device independent color space, also referred to as the profile connection space (PCS). Designated color spaces for the PCS are CIELAB and CIEXYZ defined by the International Commission on Illumination (CIE). In addition, profiles for output devices contain a simulation transform which maps from PCS to PCS which in essence describes how out-of-gamut colors are mapped onto the gamut of the output device. This permits a simulation of the output to be displayed on the monitor. In summary, then, each output profile contains the following transforms:

an input transform mapping the native device color space to the PCS;

an output transform mapping the PCS to the native device space;

a simulation transform which maps the PCS to PCS and describes how out-of-gamut colors are printed on the output device; and a gamut alarm transform which maps the PCS to a single number and indicates whether or not a given color is in gamut or out of gamut.

The format for these profiles has been standardized by the International Color Consortium (ICC). A number of companies have produced and sold profiles which conform to this standard, as well as software applications which generate conforming profiles from measured data.

The generation of all of the above listed transforms within a profile is facilitated by having knowledge of the color gamut of any color capable device in the workflow chain. Furthermore, the ICC standard is increasingly being accepted by the color reproduction industry as a way of attaining portable color communication across different devices and computer platforms. As a result, the ability to efficiently and accurately generate color gamuts, which is an important component in characterizing any color capable device, has taken on new importance.

In the past the gamut of a color device, such as a printer, has been developed by measuring the color outputs of the printer using color signals spaced at regular intervals in the channels of the device space, developing a forward model that describes the color behavior of the device when colors are transformed from the device color space to the PCS, inverting the model at each quantized $L^*$ and theta value in the PCS and finding the color of greatest chroma which represents the gamut boundary (see for example U.S. Pat. No. 5,563,724). This approach has two practical problems. The first is that the inversion of the forward model is computationally intensive making gamut construction or mapping impractical for real time applications. What is needed is a system that is less computationally intensive and is suitable for real time applications.

The second problem relates to the fact that theta quantization on an $L^*$ plane is linear, i.e. the differences between each bin is constant. Linear quantization increases the likelihood that important gamut features will not be accurately described due to quantization error. Because of this problem the most saturated colors in the gamut can be missed. This problem can be minimized by increasing the quantization in theta but at the cost of increased computational time and disk storage requirements. What is needed is a system that describes the gamut while still being computationally fast.

SUMMARY OF THE INVENTION

It is an object of the present invention to provide a system that can determine the gamut in substantially real time.

It is also an object of the present invention to produce a gamut without requiring that a forward model be inverted during the gamut construction process, that is, the forward model is used directly.

It is another object of the present application to accurately determine the gamut of a device.

The above objects can be attained by a system that provides an efficient way of computing the color gamut of a medium employed in a color rendering process, such as output process. The system creates a forward model and uses this model to generate a plurality of color points known to be on the surface of the gamut. During their generation these points are first quantized with respect to the lightness axis. Then, for each lightness plane, the inter-connectivity of these points is established by a specialized sort in such a way as to produce a coherent gamut boundary. At that point there is sufficient data to permit the construction of a gamut object which allows for queries of gamut extent and inkings as a function of theta and hue angle as defined in a PCS such as the CIELAB color space.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 7b1 and 7b2 show how the CMY inks vary as the boundary is traversed circumferentially in a counter-clockwise direction.

DESCRIPTION OF THE PREFERRED EMBODIMENTS

The present invention, as will be discussed in detail below, provides a way for the efficient and accurate computation of the color gamut of a medium employed in a color process, such as an output process, without the need of using computationally costly iterative search techniques. Once computed, the color gamut facilitates the creation of high quality profiles for fine color reproduction. Additionally, it is one of the robust characteristics of this technique that gamuts can be computed in this manner for inksets which do not contain the neutral axis and in which the most saturated colors are included.

Figure 1:
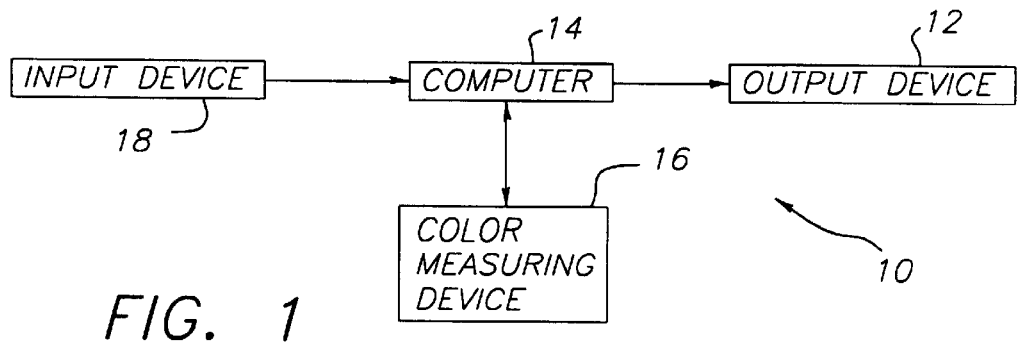
FIG. 1 depicts hardware components of the present invention.

The present invention is typically used in a system 10, such as depicted in FIG. 1, and a portion of such a system 10 is involved when the gamut produced by the present invention is used during transformation operations. When the gamut of an output device 12, such as a printer or a display, is being determined, a computer 14 drives the output device 12 with a set of color signals, as will be described in more detail herein, to produce color patches. The printed output patches have their color measured by a color measuring device 16, such as a spectrophotometer, that produces color values suitable for the desired profile connection space (PCS). These color measurements and the input drive values are then used to determine the gamut as discussed in detail later herein. For an input device 18, such as a scanner or a camera, a set of color patches is measured by device 16 and input by the input device 18. These values are used to determine the gamut. The computer 12 includes the typical memory and storage devices, such as floppy and hard drives, to allow the present invention to be implemented as a program product or downloaded over a medium such as a network.

During a typical use of a gamut developed according to the present invention, a picture could be input by the input device 18 (or could be obtained from a storage source, such as a CD ROM, or from a network, such as the Internet) and converted by the computer 14 into an image which is output by the output device 12. During this conversion out-of-gamut color values could be flagged and moved to in-gamut color values.

The description herein generally relates to a 3-color CMY output process commonly used by color printers and other color-reproduction technologies, which constitute a particular and important application of the invention. However the invention has much broader application, namely to color output processes in which the intensity of the colorant channels can be controlled digitally. Specifically, other important color reproduction processes are those employing 4-inks (CMYK). This description should not be construed as limiting the scope of the invention, but rather as illustrating a preferred embodiment.

Figure 2:
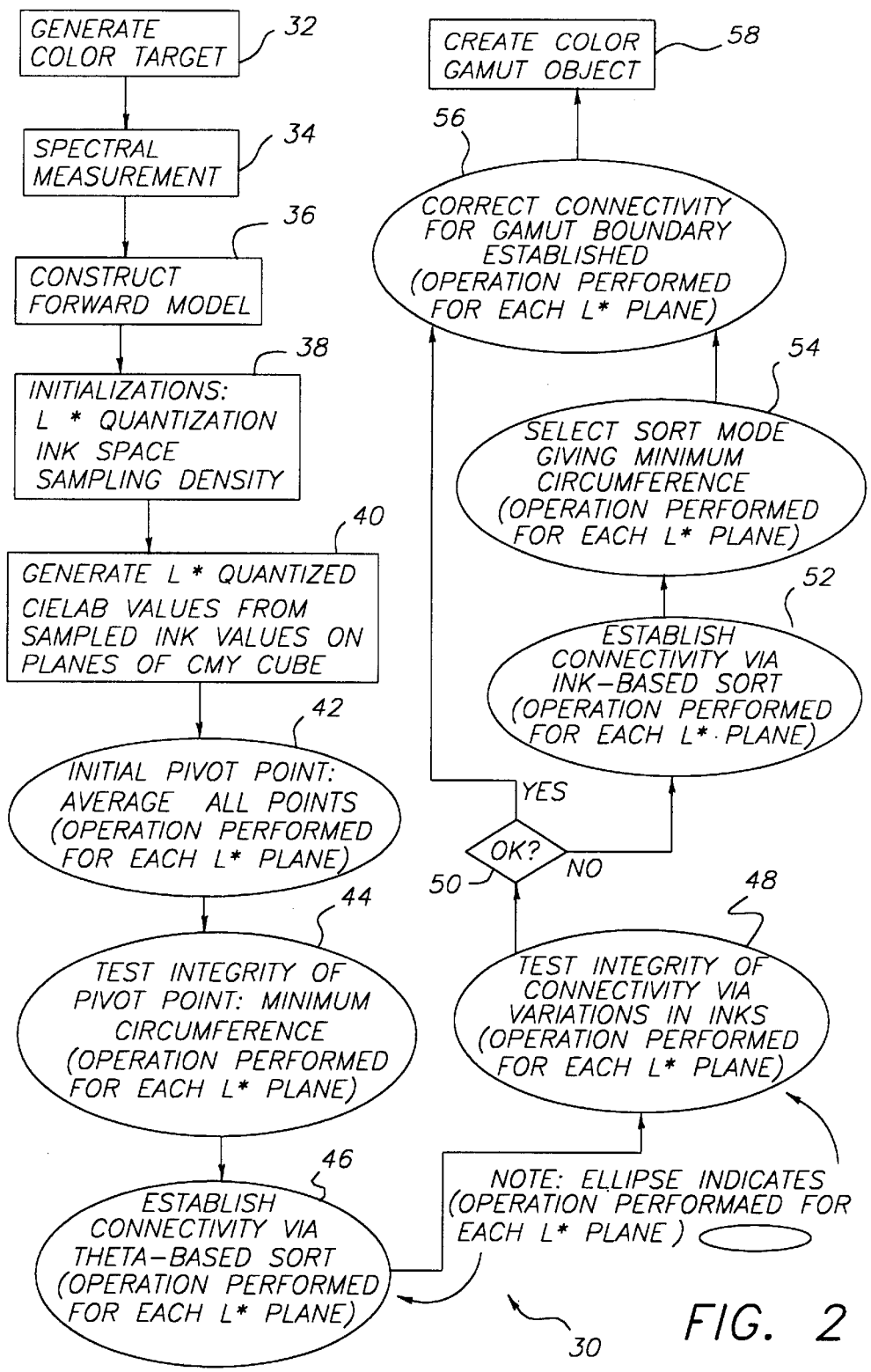
FIG. 2 is a flowchart of the process of the present invention.

FIG. 2 depicts the gamut construction process 30 according to the present invention. This gamut construction technique takes advantage of the fact that all points on the color gamut surface can conceptually be mapped back to the surface polygonal planes of polyhedral geometric solids in ink space. These surfaces are sampled in a regular manner in ink space and their values are transformed to color values via a forward model. This entire "cloud" of points positioned in color space represents the gamut of the particular output process. Conceptually, the remainder of the process is a specialized sort of these colors, first with respect to their lightness value, and then, for points of equal lightness value, sorted, such that the connectivity of the points correctly or properly defines the gamut boundary, thereby establishing connectivity for a gamut boundary.

The first step 32 in the process is to use the output device 12, such as a printer, to generate a set of color patches with known command values whose colors are representative of the overall range of colors the output process can express. Each printed output target preferably comprises patches equally stepped in ink space (preferably, 75 patches for CMY processes and 625 patches for CMYK processes). The patches are then measured 34 using the color measuring device. During this step the spectral reflectance values are preferably obtained at a 45/0 measuring geometry. Tristimulus values (XYZ) are then compute by folding in the spectrum of the preferred fluorescent D50 light source of the viewing booth. Transformation of tristimulus values to the CIELAB color space is performed in this step and is preferably based on absolute colorimetry in which an $L^*$ of 100 corresponds to a perfect white diffuser. The result is a set of command or input drive values for the output device and the corresponding device independent color values measured for those input values.

The next step 36 is to conventionally mathematically model the relationship between ink (command values sent to the output device) and the resulting color (measured color values). This model is referred to as the "forward model" for the output device. For every color space point (L*a*b*) there exists an inking which when put through the forward model as an input yields the L*a*b* as an output. The forward model is obtained by fitting a suitable basis function using regression techniques to the data using conventional techniques, such as described in Press et al., Numerical Recipes in C, 1988, Cambridge University Press, pages 517–565. The exact nature of this basis function is not important for this process. The model can be a polynomial in cyan, magenta, yellow and black ink. It could also be a piecewise polynomial function with each piece representing a subset of CMYK space. The importance of the basis function lies in the fact that it establishes an analytical relationship between ink and color in a given direction: ink to color. Given some inking, the forward model permits an efficient calculation of its corresponding color. Going in the inverse direction, which is part of the prior art gamut determination process, requires computationally intensive iterative search techniques. Standard deviations of less than 1 delta-Eab units when comparing computed results to experimentally measured patches are representative of a good fit when determining whether the developed basis function is suitable.

Figure 3A:
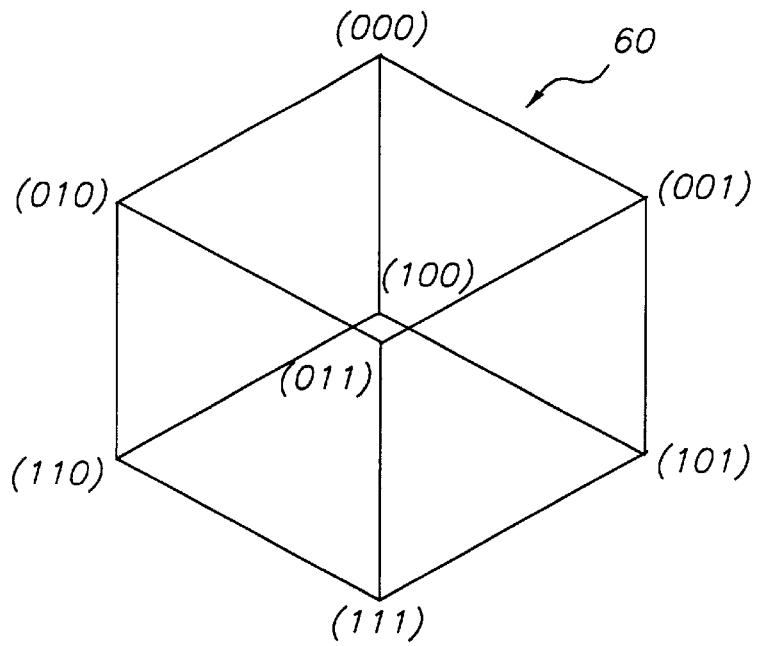
FIG. 3a shows a CMY cube ink space gamut.

The next operation is to determine 38 the L* range over which the quantization along the L* axis will occur. This is accomplished by computing, via the forward model, the color of the maximum and minimum inkings. For CMY processes (see FIG. 3a), these inkings are (1,1,1) and (0,0,0) respectively in the normalized range of 0 to 1. L*max is dependent upon the whiteness (luminance) of the paper substrate and for high quality glossy papers is typically in the range of 92–95 L*. L* min is a measure of how dark a color a set of colorants can achieve and varies relatively widely depending on the quality of the output process. For high quality output like Matchprint Proofing systems, an L*min of 4 is achievable. Whereas low dynamic range media like newsprint can only attain values in the range of 12 to 18 for L*min. The next step is to decide into how many levels to linearly quantize this range (typically between 64 and 128 levels with 128 preferred). However, there is no requirement that all L* levels be equally spaced. To ensure that the most saturated colors are represented in the gamut description, the L* values corresponding to the colors of the following inkings in Table 1 are inserted in the quantization scheme. These points in ink space map to vertices on the faceted surface of the gamut in color space.

TABLE 1

| C | M | Y | |
|---|---|---|---|
| 1 | 0 | 0 | Cyan |
| 0 | 1 | 0 | Magenta |
| 0 | 0 | 1 | Yellow |
| 0 | 1 | 1 | Red |
| 1 | 0 | 1 | Green |
| 1 | 1 | 0 | Blue |

The inkings of points on the gamut surface have unique properties which distinguish them from the inkings of points interior to the gamut. For CMYK processes, an interior color can be achieved with multiple inkings due to the visual equivalency between K and CMY. This is known as gray component replacement (GCR). But for points on the gamut surface, only one unique inking exists to achieve that color. That unique inking has the following properties; i) generally, two of the inkings are at values that are intermediate between their max and min; ii) the remaining ink values are at either their max or min values. The two inks which vary account for the faceted nature of the polyhedral solid in inkspace.

Figure 3B:
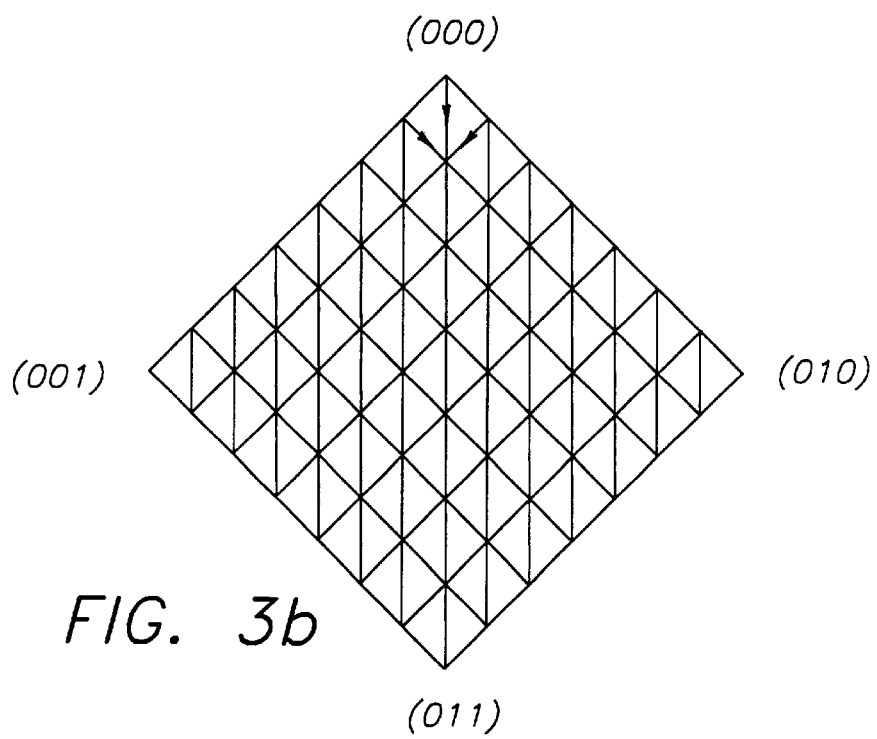
FIG. 3b shows the mesh of ink paths on a cube plane.

As mentioned earlier, points on the gamut surface in PCS color space map back to surface points on polyhedral solids in the ink space. For a 3-ink process (CMY) this is a 6 sided cube 60 in (See FIG. 3a); while for 4-ink processes (CMYK) it is a 12 sided dodecahedron. Using the cube for the 3-ink process as an example (directly extensible to the 4 ink dodecahedron), the essence of the process of the invention is to sample all surfaces of the cube in ink space in a regular manner, such as along paths (see FIG. 3b) parallel to the edges of the polygonal plane (see FIG. 3a), as well as at the specialized points noted above, such as the vertices of the ink space polygon. At each sampled point in ink space (CMY), the inking is put through the forward model and a CIELAB value is generated 40 (see FIG. 2). Colors whose L* value corresponds to a quantization level are recorded in a list for that L* plane. A preferred method for converging to a quantized L*value is to use a conventional 1-dimensional Simplex algorithm which can be optimized to quickly converge to the desired quantized L* value. Other techniques such as Golden Section Rule in 1-dimension (see Press et al. Numerical Recipes in C, 1988, Cambridge University Press, page 293 could be used. Referring to FIG. 3b, the sampling ink paths are traversed from top ((0,0,0) vertex) to bottom ((1,1,1) vertex) in the direction of the arrows which generally implies an increasing amount of total ink being laid down. As a result, there is an implicit notion of L* decreasing for colors computed via the forward model along any ink path. FIG. 3b depicts the mesh of sampling paths on a plane in inkspace. The mesh consists of 3 sets of paths; 1 set parallel to the line defined by endpoints (000) and (010); another set parallel to the line defined by endpoints (000) and (001), and the last set of paths which are parallel to the diagonal line connecting endpoints (000) and (011). Note that all inkings derived from this plane have 2 inks that vary and the remaining ink is fixed at a minimum value of 0. The common trait in traversing these paths from top to bottom is that the amount of ink laid down increases which consequently implies colors of decreasing L* are being defined. However, a different resolution mesh is possible and an eight path per edge resolution is preferred.

At the outset of the gamut construction process, exactly how many points will be collected is unknown because, for example, the number of L* planes crossed by the paths varies. The number of points is proportional to the number of levels quantizing the L* axis and also to the sampling granularity of the ink path mesh on the surface planes of the geometric solid in ink space. The number of points need not be known because what is known after this stage is completed is that the entire collection of points in the lists for the L* planes represents a complete and accurate description of the gamut. Recall that folded into the point generation process 40 is quantization along the L* axis; only those colors whose L* values lie within an epsilon of the quantized L* values are selected.

After step 40, the needed points for defining each L* plane are in hand, but there is no a priori information as to how these points should be connected or ordered to form a coherent gamut boundary. The initial connectivity list is simply the list of the points as they are randomly generated for each L* quantization bin. The remainder of the algorithm attempts to establish the proper ordering. Different strategies are employed which attempt this ordering. Although there is no criteria which establishes the absolute correctness of a specific ordering scheme, criteria does exist which allows one to select between two different ordering schemes. Namely, the connectivity of points which yields the smaller circumference is preferred. In principle, the correct ordering scheme yields the minimum circumference of that gamut slice. The process for determining an ordering that constitutes the gamut will now be discussed.

Figure 4A:
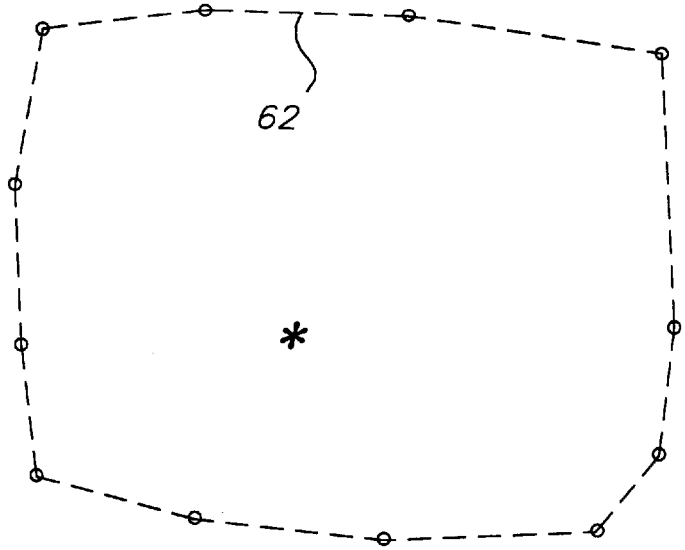
FIG. 4a shows a convex sided gamut boundary which is correctly ordered by theta-based sorting.

In principle, if a given point is known to be interior to the gamut boundary, then by utilizing it as a reference, the cylindrical coordinates (r,θ,L*) of all the randomly generated points on an L* plane can be computed. By convention, 0 degrees is taken to be parallel to the a* axis and theta increases in a counterclockwise direction. A sort with respect to theta (θ) can establish the proper connectivity (the ordered sequence of the list) for the majority of gamut boundaries (see 62 in FIG. 4a). This interior reference point is referred to as the pivot point and its initial value is obtained by averaging all the a* and b* values of points collected on a given L* plane. Its exact location is usually unimportant for gamut shapes which are well behaved and whose sides are concave. One might be tempted to always utilize the neutral point as the pivot point for a given L* plane, but this would limit the robustness of the process. Many CMYK gamuts often pull away from neutral in darker L* regions. Furthermore, inksets other than the traditional CMYK may not have neutral in their gamut at all.

Figure 4B:
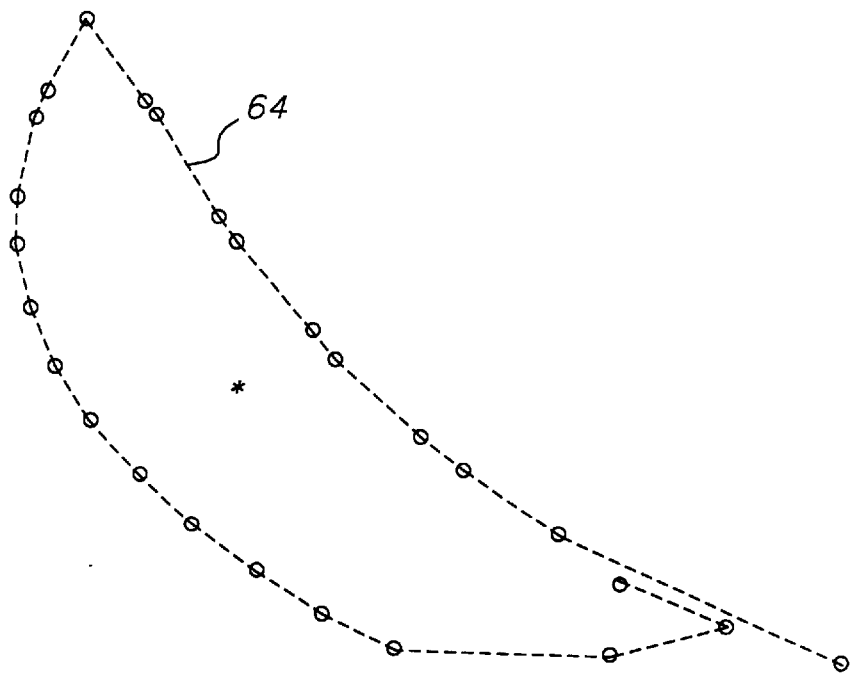
FIG. 4b shows a highly curved gamut boundary which is incorrectly ordered by theta-based sorting.

In practice, it is preferred that the pivot point fall toward the positional center of gravity of a gamut boundary. For gamut boundaries whose sides may be somewhat convex, a pivot point that is relatively close to a convex side can cause errors in connectivity. Unfortunately, for gamut shapes in the L* plane which have a high degrees of concavity and convexness, simple averaging can result in pivot points which are either near or outside of convex shaped gamut boundaries. As shown in FIG. 4b this can occur for banana-like shapes of the gamut (outlined by a dashed line 64) which are not uncommon in the most saturated yellow region of the tonal scale. The resulting theta-based sort 66 depicted in FIG. 4b is incorrect.

Once the initialization step 42 of determining the initial pivot point by averaging and performing an initial theta-based sort is performed to establish an initial sort and the computing an initial circumference is performed, the integrity of the initial pivot point-can be tested 44 as discussed below.

The definition of the best gamut boundary as that sequencing of points which yields the minimum circumference permits one to devise a strategy which-maximizes the likelihood that this indeed occurs. In its essence, this strategy entails placement of the pivot point at various positions within the minimum bounding box for the set of gamut points and selecting that sequencing which yields the minimum circumference. A detailed description of this positioning strategy follows.

Figure 5:
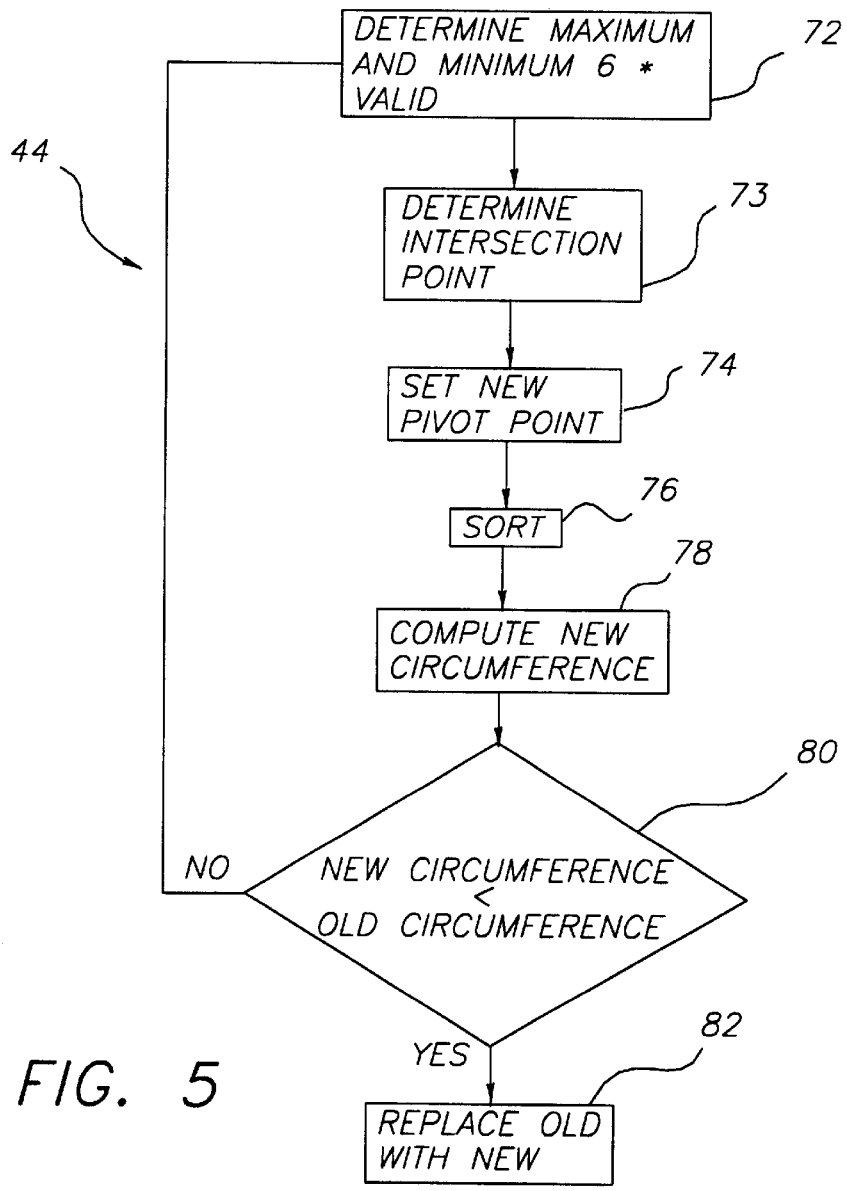
FIG. 5 illustrates the process of determining whether a point is an appropriate pivot point.
Figure 6:
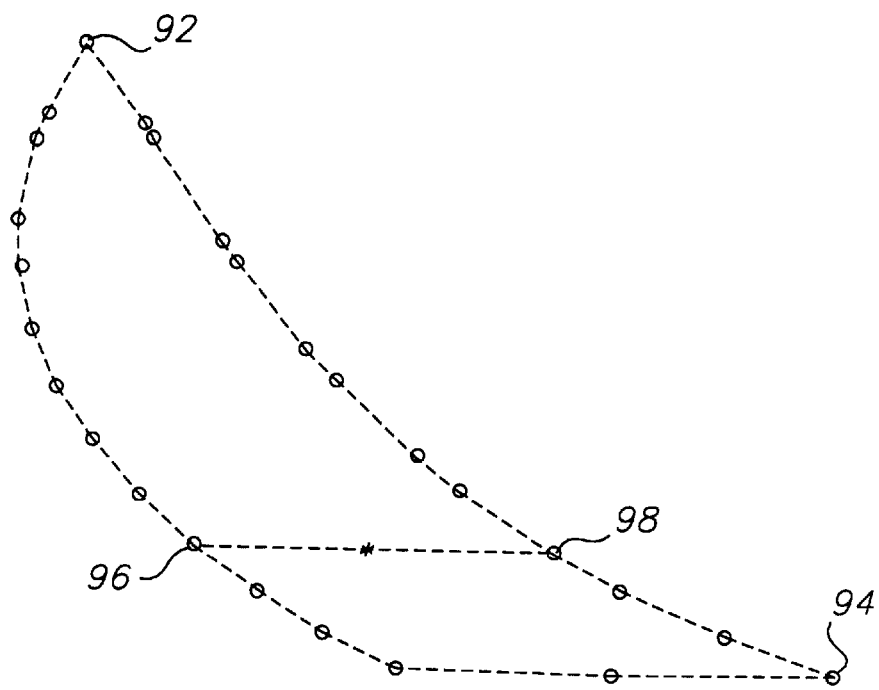
FIG. 6 depicts the steps for determining a new pivot point.

The first step 72 (see FIG. 5) is to determine the maximum and minimum b* values for the collection of points at a given L* plane. These are points 92 and 94 in the example gamut point set depicted in FIG. 6. Next, for 9 levels in this interval the intersections of an infinite horizontal line parallel to the a* axis and the collection of points is computed 73 (See Intersection of Line Segments, Mukesch Prased, Graphic Gems II, page 7, Academic Press, Inc., San Diego.) Nine pivot points are tested: one for each parallel line going through the initially determined gamut shape. The pivot point which yields the minimum circumference is selected. If none of the new pivot points yields a circumference that is less that the original, then the original pivot point is retained. Typically, two intersection points per parallel line are found based on the initial theta ordering. The two points are 96 and 98 in FIG. 6. A new pivot point is set 74 as a point halfway between these two intersection points. A theta-based sort is then performed 76 using this new pivot point. A new circumference is now computed 78 with respect to this new pivot point and each intersecting line. The new circumference is compared 80 to the old circumference and the pivot point position which yields the minimum circumference is designated as the current pivot point and the old circumference is replaced 82 by the new circumference. FIG. 6 shows how this procedure repositions the pivot point so that the gamut boundary, originally shown in FIG. 4b, is now currently sequenced. The pivot point lies halfway between the first intersecting points 96 and 98. It lies on the first parallel line to yield a new minimum circumference. The pivot point sort associated with the selected pivot point establishes 46 a connectivity for each L* plane that will be further tested 50 against an ink sort as discussed below.

Unfortunately, as is shown in FIG. 4b, gamut boundaries which contain a great deal of curvature may be incorrectly sequenced by theta. In fact, for some shapes, there may be no position within the gamut boundary which yields the correct connectivity in a theta-based sort. Fortunately, there is a way of testing the integrity of the initial ordering of the points with respect to theta by looking at how the inks are varying. The variation of the inks are expected to follow a known pattern as any gamut boundary is traversed. Thus, the integrity of the initial ordering obtained by the theta sort can be checked 48 by a testing step 50 (see FIG. 2) which tests the inking variation in the final theta sort list for a particular L* plane by comparing it against expected ink behavior. When a discrepancy arises, the points are swapped in position within the list, until the expected ink variation behavior is realized. This establishes 52 a connectivity based on the ink sort. This ink-based ordering can in turn be selected 54 as the ordered list by computing the circumference of the new ordering and comparing it against the theta-based ordering. The ordering which yields the minimum circumference value is chosen thereby establishing the correct connectivity, that is, the proper order for the list of color values for each L* plane.

Figure 7A:
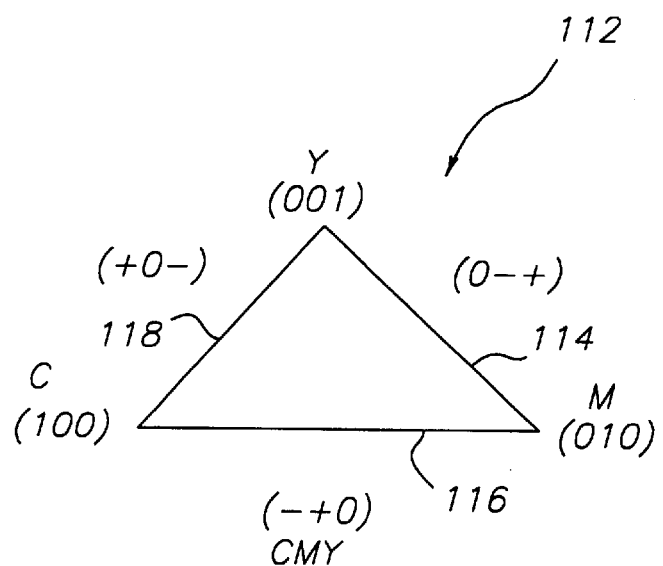
FIG. 7a shows an idealized triangular gamut boundary for a CMY process.

FIGS. 7b1 and 7b2 include illustrative plots of how the inks ideally vary when the gamut boundary is traversed circumferentially for highlights and shadows, respectively. As shown in FIG. 7a, the triangle 112 represents an idealized gamut boundary at constant L* whose vertices correspond to a single inking at maximum value and the other two at 0. Visual examination of the ink cube in FIG. 3a leads one to the general understanding that the inkings of points on all parts of the gamut surface are distinguished from interior inkings by the fact that at least one of the inks is either 0 or 1. This property underlies the basis of the ink sort process.

FIGS. 7b1 and 7b2 show, in an idealized fashion, how gamut inkings vary in both the tonally lighter (highlights—FIG. 7b1) and darker (shadow—FIG. 7b2) regions of the gamut as the boundary is traversed in a counterclockwise direction. For example, as the surface 116 is traversed from cyan (100) to magenta (010) the Y inking in the CMY tuple is zero. In the lighter regions, the extrema of the gamut (vertices of the triangle) map to inkings where one of the inks is at a maximum and the other two are zero. As L* decreases, of necessity the overall amounts of inks at these positions increases, given the nature of subtractive color reproduction. Zero values rise to some finite amount and the region abutting the single primaries clip against the 1.0 as shown in FIG. 7b2. This essential behavior of the chromatic inks exists even for 4 ink CMYK color reproduction systems.

Careful examination of this behavior as shown by FIGS. 7b1 and 7b2 allows the following rules to be defined. For successive differences of the i-th and (i−1)-th gamut boundary points:

TABLE 2

| DELTA | | | |
|---|---|---|---|
| C | M | Y | |
| 0 | + | − | when C = 1.0 in i-th pt |
| 0 | − | + | when C = 0.0 |
| − | 0 | + | when M = 1.0 |
| + | 0 | − | when M = 0.0 |
| + | − | 0 | when Y = 1.0 |
| − | + | 0 | when Y = 0.0 |

Using FIG. 7b2 as an example, the above Table 2 is interpreted in the following manner: when C=1.0 for the i-th point, compute the signed differences between the i-th and (i−1)-th point. There should be no <0> difference for C, a positive <+> difference for M and a negative <−>difference for Y. This Table 2 can be discerned by inspection of the variation of ink in FIG. 7b2.

When there be an inconsistency in the inking differences as determined by the expected results set forth in Table 2, points are swapped until the ink behavior is consistent with the expected results. If after the points have been swapped exhaustively the ink behavior is still corrupt, with respect to the rules set forth above, then the original theta-based swap is retained.

At this stage in the gamut construction process the ordering of points which yields the true gamut boundary has been established. In some instances, points may be quite close to one another and consequently could be considered redundant data. Ordered points which are within an epsilon of one another (epsilon=0.1 delta-Eab units) are preferably eliminated.

At this point, each L* plane has the following attributes:
a set of points in color space which define the gamut boundary;
a set of points in ink space which map to the associated color space points; and
an ordering of these points which correctly defines the gamut boundary.

This is sufficient data for someone of ordinary skill in the art to fashion or create 58 (FIG. 2) a gamut object which can be queried for the gamut boundary and associated inking at any L* and hue angle.

Earlier gamut calculation techniques required inversion of the forward model which necessitated the use of computationally expensive iterative search methods to accomplish forward model inversion. The present invention has the advantage of being very fast to compute since computationally costly inversions are not required, i.e. forward model is used directly to establish a connectivity for a gamut boundary. The produced gamut offers superior accuracy in describing the gamut over earlier techniques in that the sampling in ink space assures that the most saturated colors are represented in the gamut description.

The present invention has been described with respect to the preferred embodiment being a software program. Those skilled in the art will readily recognize that the equivalent of such software may also be constructed in hardware. Additionally, the program can be loaded onto a disk and distributed as a product or transferred over a network, such as the Internet, as a product.

The present invention has been described with respect to determining the gamut for devices and media with three and four dimensional ink spaces. The invention can be applied to higher dimensional color spaces such as the seven-color color space CMYKRGB.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

| Reference Number List | |
|---|---|
| 10 | System |
| 12 | Output device |
| 14 | Computer |
| 16 | Color measuring device |
| 18 | Input device |
| 30 | process |
| 32–52 | process steps |
| 60 | CMY cube |
| 62 | gamut boundary |
| 64 | incorrect gamut boundary |
| 72–82 | process steps |
| 92–98 | points |
| 112 | gamut boundary |
| 114–118 | gamut surface |

What is claimed is:

1. A process of describing a gamut for a device, comprising:
obtaining a forward model of the device; and
directly obtaining independent color values for ink values known to be on the surface of the gamut using the forward model and establishing a connectivity of the values for a gamut boundary which comprises:
generating independent color space color values from sampled ink values on the planes of an ink space polyhedron;
establishing an initial connectivity of the color values and determining a circumference for the initial connectivity;
determining a pivot point for the color values;
sorting the color values by angles with respect to the pivot point;
determining a circumference of an angle sorted polygon defined by the angle sorted color values;
sorting the color values of the angle sorted polygon responsive to ink behavior creating an ink-sorted polygon;
determining a circumference of the ink-sorted polygon; and
selecting the polygon with the minimum circumference as the gamut.

2. A process of describing a gamut for a device, comprising:
obtaining independent color values for known command values processed by a color device being characterized;

creating a forward model of the device using the color values and the command values;

generating independent color values from sampled ink values where the ink values are on the planes of an ink space polyhedron of the device;

establishing an initial connectivity of the color values and determining a circumference for the initial connectivity;

determining a pivot point from the color values;

sorting the color values responsive to angle using the pivot point;

determining a circumference of an angle sorted polygon defined by the angle sorted color values;

sorting the color values of the angle of the angle-sorted polygon responsive to ink behavior creating an ink-sorted polygon;

determining a circumference of the ink-sorted polygon; and selecting the polygon with the minimum circumference as the gamut.

3. A computer program product for generating a color gamut description for any medium expressing color which color can be controlled by digital command values, comprising:

a computer readable storage medium having a computer program stored thereon for performing the steps of:

deriving a forward model from colorimetric measurements of a color target on the medium expressing the color and generated by command values for the driving device;

sampling a surface of the colorant gamut at regular intervals in colorant space and converting the colorant values to color values in color space at quantized $L^*$ values;

finding a valid pivot point within collection of converted color values at each $L^*$ level;

converting the color values at each $L^*$ plane to cylindrical coordinate points and establishing a connectivity of the points by sorting the coordinate points with respect to theta relative to the pivot point producing a theta-based sort;

testing the validity of the theta-based sorted coordinate points by comparing an ink expected behavior of the chromatic colorants as the points are sequenced via the theta sort;

establishing a colorant-based sort with respect to valid variation in colorants when the expected behavior does not exist in the colorant behavior based on the theta sort; and selecting between the colorant-based sort and a theta-based sort on the principle of minimum circumference.

4. A computer product, comprising a recording medium readable by a computer and a data structure recorded on the recording medium defining a gamut of a color device, said data structure comprising an ordered list of independent color values including the most saturated colors of the gamut, the list including a regular sampling of the colors and the gamut being constructed for colorant sets whose gamut in color space does not envelope the neutral axis.

* * * * *